March 25, 1952    A. H. LOCKHEED ET AL    2,590,333
VALVE APPARATUS FOR FUEL DISTRIBUTING SYSTEMS Filed May 14, 1945     3 Sheets-Sheet 1

Inventors
Allan H. Lockheed
Homer J. Seale
By Lyon & Lyon
Attorneys

March 25, 1952 A. H. LOCKHEED ET AL 2,590,333
VALVE APPARATUS FOR FUEL DISTRIBUTING SYSTEMS
Filed May 14, 1945 3 Sheets-Sheet 2
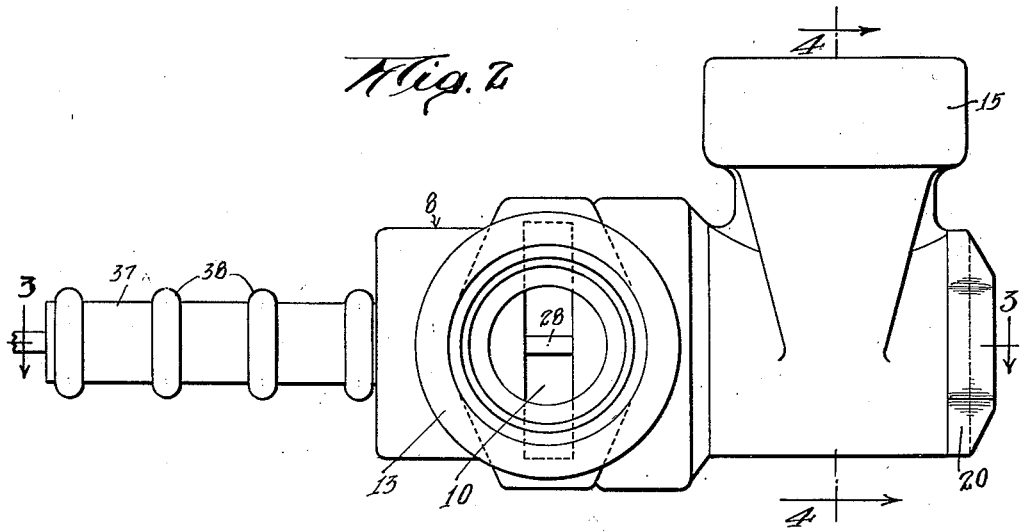
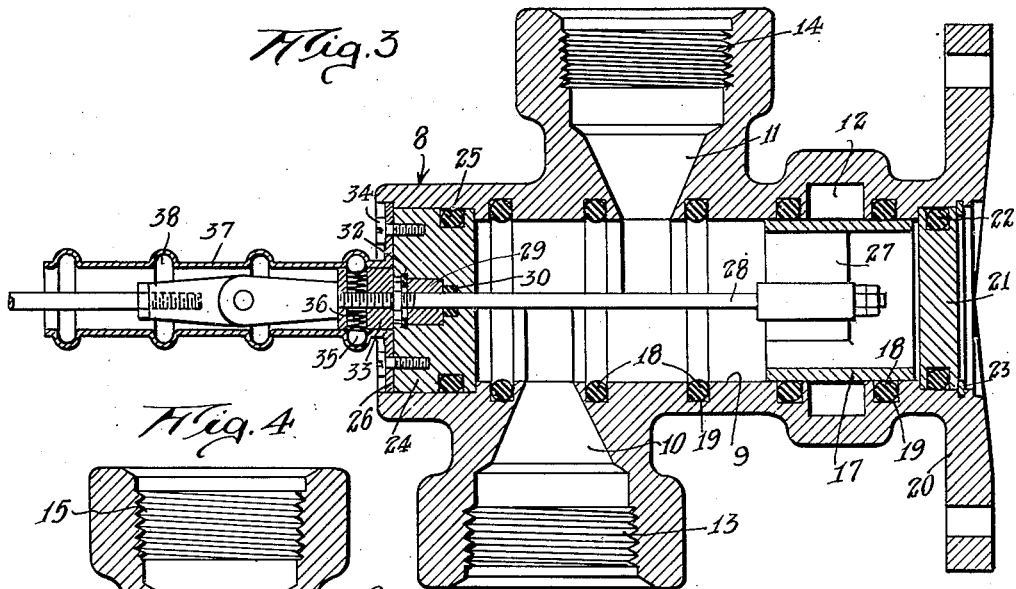
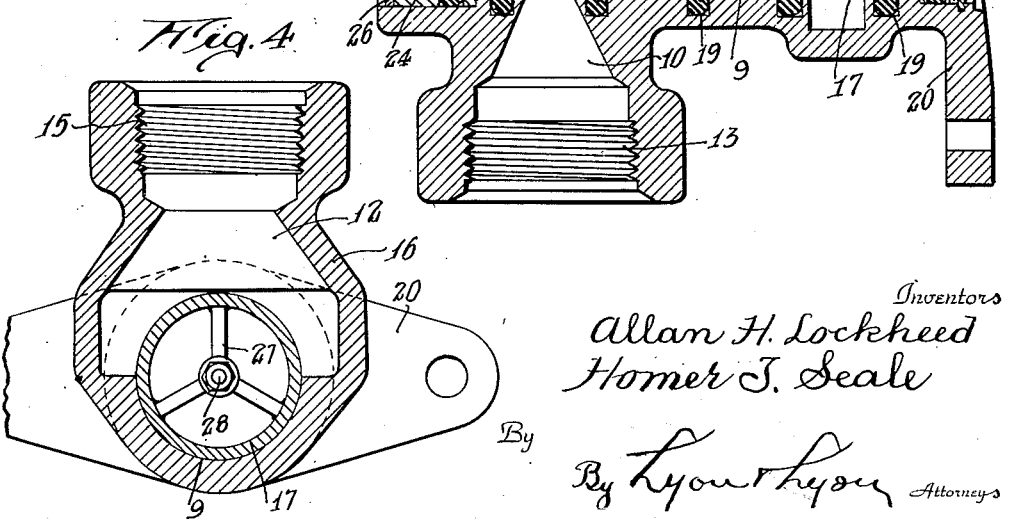
Inventors
Allan H. Lockheed
Homer J. Seale
By
Lyon & Lyon Attorneys

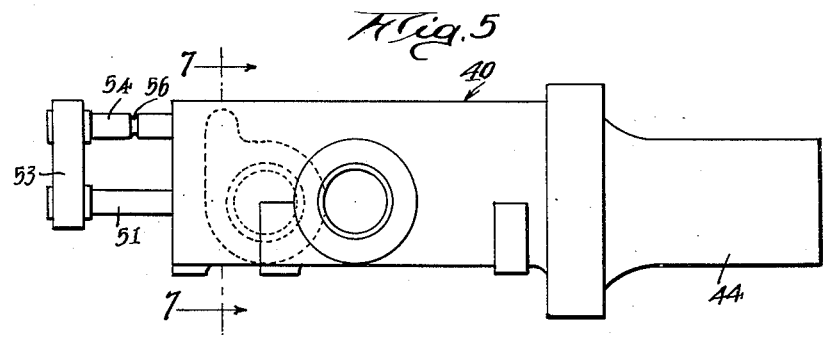
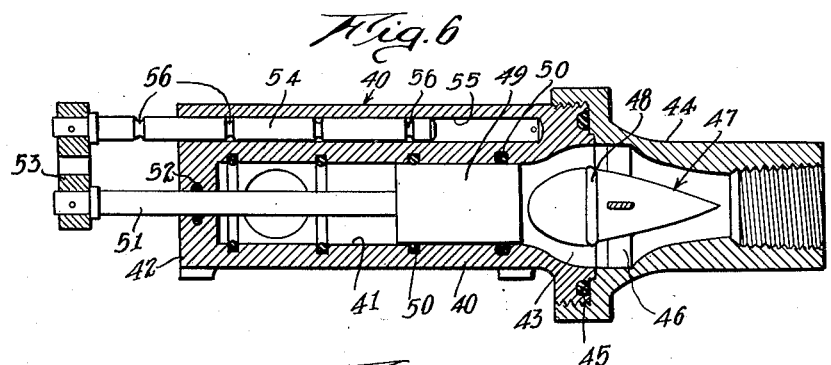
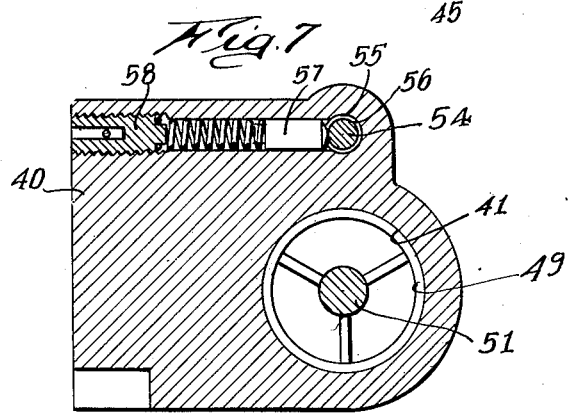

Patented Mar. 25, 1952

2,590,333

UNITED STATES PATENT OFFICE 2,590,333

VALVE APPARATUS FOR FUEL DISTRIBUTING SYSTEMS

Allan H. Lockheed, Arcadia, and Homer T. Seale, Alhambra, Calif.; said Seale assignor to said Lockheed Application May 14, 1945, Serial No. 593,714

3 Claims. (Cl. 251—78)

This invention relates to a valve apparatus and to a fuel distributing system including such valve apparatus intended for use in controlling the distribution of fuel from fuel tanks to motors. The apparatus of the present invention is of particular value for controlling the fuel distribution to the engines of a multimotored aircraft.

Multimotored aircraft are provided with a plurality of fuel tanks and the aircraft is required to contain a fuel distributing system by means of which the fuel of any such tanks may be distributed to the engines of the aircraft in any desired manner. Heretofore these fuel distributing systems have frequently been unsatisfactory in performance. Previous to the present invention, the two principal types of valves employed on such fuel distributing systems have been either the plug-cock type or the poppet type of valve.

The plug-cock type of valves are given a cork facing for sealing the valve against leakage, but have proven unsatisfactory in that such cork facing is frequently torn out around the port to the plug with the result that leakage occurs. Both fuel and air leakage are serious. Air leakage operates to establish an air-lock in the fuel distributing line. Another difficulty with the plug-cock type of valve is that the plug-cocks tend to bind when left stationary.

The poppet type valve has proven unsatisfactory particularly for aircraft operating at high altitudes. At high altitudes very careful design and engineering of fuel distributing systems of a multiengine aircraft is necessary if gas leakage and air leakage of the distributing lines are to be avoided. The movement of the fuel through the distributing lines, including the valves of the line, must be under conditions which avoid turbulence, or such turbulence will create air-locks in the system. The poppet type valve is unsatisfactory at high altitudes because the turbulence around the valve heads creates air-lock.

It is the general object of the present invention to provide a valve and fuel distributing system for use on multiengine aircraft designed to minimize turbulence such as would create air-lock or gas-lock in the fuel distributing lines.

A further object of the present invention is to provide a valve which is designed to be properly sealed against leakage, which valve does not include any packing material of the type which may be torn off in operation.

The foregoing objects of the invention are accomplished by the provision of a valve which includes a hollow piston selectively movable to close different ports and which piston is movable through a cylinder with respect to which the piston has slight clearance which allows the piston to be fluid-balanced in operation. The hollow piston which forms a moving valve head in the present invention can readily be constructed and arranged so as to provide a smooth fuel flow, minimizing turbulence such as might create gas-lock. Moreover, the use of the hollow piston as a valve head in connection with the clearance balancing fluid characteristics, avoids all of the binding difficulties which are now characteristic of the plug-cock type of valve.

The valve apparatus and fuel distributing system of the present invention, together with the additional advantages of the invention, will be fully understood from the following description of the preferred forms or examples of the invention. We have, therefore, hereafter described, with reference to the accompanying drawings, the preferred forms of our invention.

In the drawings:

Figure 2 is a side view of one of the valves included in the fuel distributing system.

Figure 3 is a section on the line 3—3 of Fig. 2.

Figure 4 is a section on the line 4—4 of Fig. 2.

Figure 5 is a side view of a modified form of the valve for use in the distributing system of Fig. 1.

Figure 6 is a sectional view of Fig. 5.

Figure 7 is a section on the line 7—7 of Fig. 5.

Figure 1:
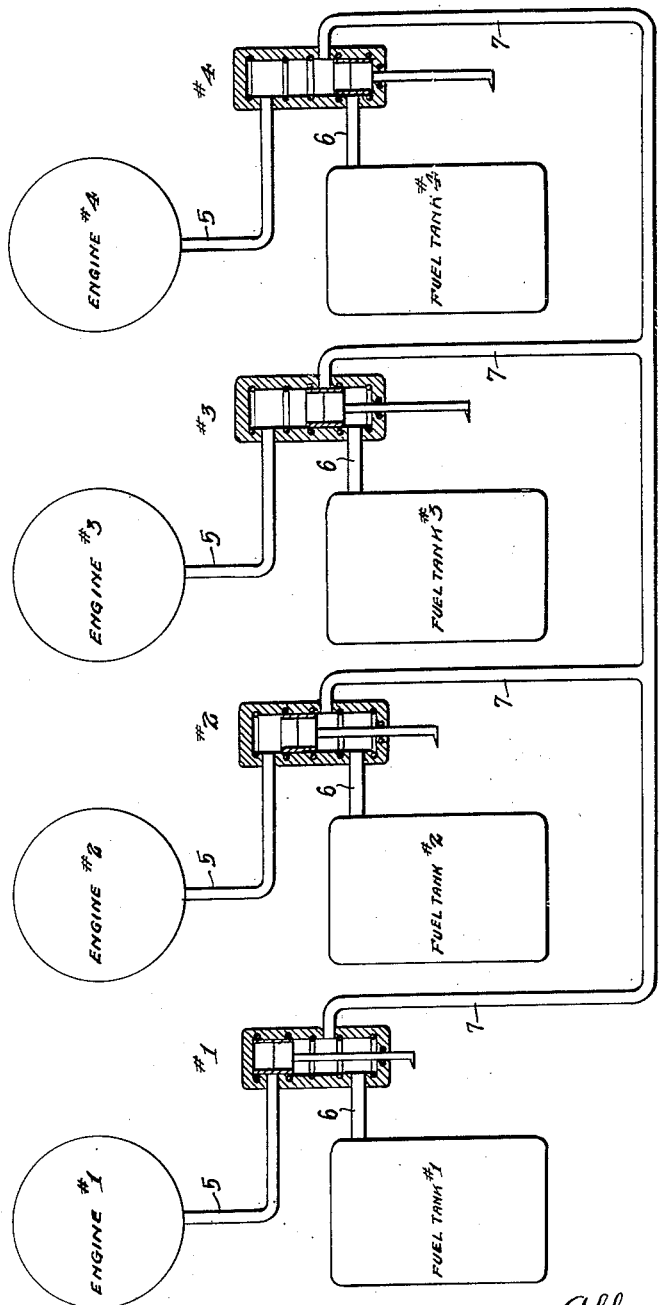
Figure 1 is a diagrammatic view of a fuel distributing system embodying the present invention.

Referring first to Fig. 1 of the drawings, we have shown a form of the invention as it is applied to a 4-engine airplane. In the drawings, there is diagrammatically indicated four engines; there is also diagrammatically indicated four fuel tanks and four valves. Each valve is connected by a line 5 to one of the engines. Each valve is connected by line 6 to one of the fuel tanks, and each valve is connected by a distributing line 7 with each of the other valves of the system.

Now referring to Figs. 2, 3 and 4 of the drawings, each of the valves is preferably of like construction, and includes a valve body 8 providing a cylindrical bore 9 open at its end. Joining the cylindrical bore 9 of the body is an end port 10 and an intermediate port 11 and a further end port 12. Ports 10 and 11 are indicated as having their axes in the same plane as shown in Fig. 3, and port 12 with its axis at right angles thereto, as indicated in Fig. 4. Threaded sockets 13, 14 and 15, respectively, are indicated for connection of lines to the respective ports 10, 11 and 12. For example, the ports 12 may communicate with lines 5 leading to the engines in Fig. 1, ports 11 may communicate with lines 7 interconnecting the valves as shown in Fig. 1, and ports 10 may connect the lines 6 leading to the individual fuel tanks of Fig. 1.

Preferably, in order to minimize turbulence in the movement of the fluid from the cylinder 9 through the ports 10, 11 and 12, such ports join the bore of the cylinder 9 through passages extending about 180° around the bore, as indicated at 16 in Figs. 3 and 4.

There is provided a hollow piston type valve member 17, which valve member has a slight clearance or free running fit with the cylindrical bore 9 of the body. A clearance in the order of about .003 inch is recommended to allow the fluid pressures to balance on the member 17. The valve member 17 is of sufficient length not only to cover one of the individual ports 10, 11 or 12, but also of sufficient length to cover such individual ports and also engage packing rings 18. The packing rings 18 are what are now known as O or T rings of synthetic rubber located in annular grooves 19 in the cylindrical bore at each side of the ports 10, 11 and 12. As is customary with such O or T rings, they extend into the bore 9 slightly so that when engaged by the valve member 17 they are somewhat compressed into their grooves 19. As indicated in the drawings, five different O or T rings 19 are provided. As viewed in Fig. 3 the first two O or T rings are spaced at the sides of the port 10; the second and third O or T rings are spaced at the sides of the port 11; and the third and fourth O or T rings are spaced apart to provide, as hereinafter pointed out, a position for the valve head 17 wherein none of the ports will be closed; while the fourth and fifth rings are spaced apart on the sides of the port 12.

At the right of the valve body 8 the body is provided with an aperture flange 20 for mounting purposes. The right end, as viewed in Fig. 3 of the drawings, is normally closed by a plug 21 having an annular groove therein for receiving an O or T ring 22 for packing against leakage. The plug is held in position by a split ring 23. At its opposite end the bore of the valve body is closed by a plug 24 which is provided with an annular groove for holding the O or T ring 25 for sealing against leakage. The plug 24 is held in by a ring 26.

The valve member 17 is provided with a spider 27 by means of which the valve member 17 is attached to an operating rod 28 which extends through the bushing 29. The bushing 29 is indicated as having a recess from its outer side along the bore of the bushing, and the base of said recess is provide with an O or T ring 30 engaging the rod 28 for sealing against leakage along the rod. The O or T ring 30 is held in position by the bushing 29 which in turn is held in position by a split ring 32.

A cross-head 33 is mounted on the rod 28 and provided with radially extending bores in which are positioned balls 35 pressed outwardly by springs 36. Secured as indicated by screws 34 to the end of the plug 24 is a tube 37 having a plurality of spaced apart grooves 38. The spacing between the grooves 38 corresponds to the spacing between the different O or T rings 18. The grooves 38 are adapted to receive the balls 35 and latch the operating rod 28 in one of its four intended operating positions.

With the form of the invention shown in Figs. 1 to 4 of the drawings, it will be seen that when the hollow piston valve head 17 is moved to the first position, as viewed in Fig. 3, the port 10 is cut off, the tank connected with that valve is shut off from communication with the fuel distributing system; and when the member 17 is moved to the second position port 11 is closed and that valve then shut off from communication with the remainder of the fuel distributing system. In this position fuel may be passed from the fuel tank connected with the valve to the particular engine connected with the valve. In the third position all of the ports are opened so that all of the engines are simultaneously drawing fuel from all of the fuel tanks. In the fourth position of the valve head or member 17 the port 12 is closed, shutting off the engine connected with that particular valve in question but the valve then allows communication of the fuel in that tank with the remainder of the distributing system.

With the system shown, the normal operating procedure would be to move all the valve members 17 so as to close off ports 11 whereby each engine would receive fuel from its own supply tank. In the event any of the four supply tanks was leaking badly the valve associated with that tank should be moved to the No. 3 position, in which case all of the ports of that valve are open, but the other valves of the system should be moved to close off the port 10 so that the fuel in the leaking tank is supplied to all four engines and consumed as rapidly as possible. Various other desirable operating conditions to meet various expedients encountered will be apparent to those familiar with distributing systems of this type.

Now referring to Figs. 5, 6 and 7 of the drawings, we have shown a modified form of valve which may be used in the system illustrated in Fig. 1. In this form of the invention the valve body 40 is indicated as having a substantially cylindrical bore 41 normally closed at one end, as indicated at 42. The other end of the bore flares outwardly, as indicated at 43, and is open. A coupling 44 is indicated as threaded to the end of the body 40 and sealed thereto by a packing ring 45. The coupling 44 may be used for coupling the valve to the lines 5 (Fig. 1) leading to the engines of the system. In this form of the invention the fuel supply to the engines from the valve is normally from the end of the cylindrical bore. The coupling 44 is provided with a spider 46 mounting a Venturi-shaped body 47 having a packing ring 48. The packing ring 48 is adapted to engage the inner surface of a hollow piston head 49 in one operating position of the device and thereby close the bore against supplying fuel to the engine. The bore 41 of the body is indicated as having four of the spaced apart sealing rings 50 of the O or T type. The hollow cylindrical valve 49 is of a length to cover simultaneously two of the rings 50 and there are thus four operating positions for the valve 49 in the bore 41. When the valve 49 contacts the first two rings 50 the lines 6 leading to the tanks are cut off; when the valve 49 contacts the second and third rings 50 the valve is shut off from the distributing lines 7; when the valve 49 contacts the third and fourth rings 50 all ports are open; and when the valve 40 contacts the fourth ring 50 and ring 48 the flow to the engine is cut off.

The hollow cylindrical valve head 49 is connected to an operating rod 51 leading to the end of the body. A packing ring 52 is indicated for packing the rod 51. A cross-member 53 is indicated for connecting the rod 51 with a control rod 54. The control rod 54 is indicated as movable in a bore 55 in the body. The control rod 54 is provided with four spaced apart grooves 56 corresponding to the four intended operating positions of the hollow cylindrical valve head 49. For resiliently latching the apparatus of this invention in these different operating positions, the body 40 is provided with a transverse bore in which is provided a spring-pressed dog 57 movable into engagement with the rod 54. The spring-pressed dog 57 is held in position by a plug 58.

Each of the forms of the valve herein described is well adapted for controlling the flow of fluid to the engines on an aircraft without creating a serious turbulent condition, and the valves of the present invention may be incorporated in a fuel distributing system and used at high altitudes without danger of gas-lock. Moreover the method of operating the cylindrical valve heads of the present invention insures against binding or destruction of the sealing means in operation.

While the particular forms of the invention herein described are well adapted to carry out the objects of the present invention, it is to be understood that various modifications and changes may be made, and this invention includes all such modifications and changes as come within the scope of the appended claims.

We claim:

1. A valve apparatus comprising a main body having a bore, a plurality of spaced apart annular grooves in said bore, a packing ring in each of said grooves, a port in said body communicating with said bore between adjacent packing rings, a hollow valve member having a running fit with said bore and of a length sufficient to bridge said adjacent packing rings and to shut off the port therebetween, said valve member being open at its ends for the flow of fluid axially therethrough, the bore of said body expanding at one end, one of the spaced grooves being adjacent to the zone of expansion of said bore and, a body disposed centrally of said bore at said expanded end and provided with a packing ring adapted for engagement with the interior of said hollow valve member to close the axial flow of fluid through said valve member, said valve member being of sufficient length to bridge between the packing ring of said body and the packing ring in the groove adjacent the expanding zone of said body to close said bore.

2. A valve apparatus comprising a main body having a bore, a plurality of spaced apart annular grooves in said bore, a packing ring in each of said grooves, a port in said body communicating with said bore between adjacent packing rings, a hollow valve member having a running fit with said bore and of a length sufficient to bridge said adjacent packing rings and to shut off the port therebetween, said valve member being open at its ends for the flow of fluid axially therethrough, the bore of said body expanding at one end, one of the spaced grooves being adjacent to the zone of expansion of said bore, a body disposed centrally of said bore at said expanded end and provided with a packing ring adapted for engagement with the interior of said hollow valve member to close the axial flow of fluid through said valve member, said valve member being of a length sufficient to bridge the packing ring in said latter groove and the packing ring of said body, and an operating rod connected to said valve member for alternately moving said valve member to a position where the same engages the packing ring of said body to close off the axial flow and to a position where the same bridges said adjacent packing rings to shut off the port between the same.

3. A valve apparatus comprising a main body having a bore, a plurality of spaced apart annular grooves in said bore, a packing ring in each of said grooves, a port in said body communicating with said bore between adjacent packing rings, a hollow valve member having a running fit with said bore and of a length sufficient to bridge said adjacent packing rings and to shut off the port therebetween, said valve member being open at its ends for the flow of fluid axially therethrough, the bore of said body expanding at one end, one of the spaced grooves being adjacent to the zone of expansion of said bore and a body disposed centrally of said bore at said expanded end and provided with a packing ring adapted for engagement with the interior of said hollow valve member to close the axial flow of fluid through said valve member, the valve being of sufficient length to bridge the packing ring in said latter groove and the packing ring of said latter body, said hollow valve member being movable to a position where said port is uncovered and where also axial flow through said member is permitted.

ALLAN H. LOCKHEED.
HOMER T. SEALE.

REFERENCES CITED

The following references are of record in the file of this patent:

UNITED STATES PATENTS

| Number | Name | Date |
| --- | --- | --- |
| 584,682 | Garrison | June 15, 1897 |
| 1,143,999 | Rosencrans | June 22, 1915 |
| 1,477,722 | Slattery | Dec. 18, 1923 |
| 1,588,972 | Machacek | June 15, 1926 |
| 2,132,030 | Hunt | Oct. 4, 1938 |
| 2,360,733 | Smith | Oct. 17, 1944 |
| 2,365,743 | Curtis | Dec. 25, 1944 |

FOREIGN PATENTS

| Number | Country | Date |
| --- | --- | --- |
| 3,184 | Great Britain | of 1884 |